US011176229B2

(12) United States Patent
 Soryal (10) Patent No.: US 11,176,229 B2
(45) Date of Patent: Nov. 16, 2021

(54) ANTI-TAMPER SYSTEM FOR VEHICLE FIRMWARE

(71) Applicant: AT&T Intellectual Property I, L.P., Atlanta, GA (US)

(72) Inventor: Joseph Soryal, Ridgewood, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 106 days.

(21) Appl. No.: 16/590,542

(22) Filed: Oct. 2, 2019

(65) Prior Publication Data

US 2021/0103658 A1   Apr. 8, 2021

(51) Int. Cl.
    *G06F 21/31*  (2013.01)
    *G06F 21/57*  (2013.01)
    *H04L 9/06*   (2006.01)
    *H04L 9/32*   (2006.01)

(52) U.S. Cl.
    CPC ............ *G06F 21/31* (2013.01); *G06F 21/572* (2013.01); *H04L 9/0643* (2013.01); *H04L 9/3236* (2013.01)

(58) Field of Classification Search
    CPC .................................................... G06F 21/31
    See application file for complete search history.

(56) References Cited

U.S. PATENT DOCUMENTS

| 10,938,571 B2* | 3/2021 | Lysenko | H04L 9/3247 |
| 2009/0313475 A1* | 12/2009 | Roscoe | H04L 63/065 |
| | | | 713/181 |
| 2017/0352210 A1* | 12/2017 | Maiwand | G07C 9/00857 |
| 2018/0009416 A1* | 1/2018 | Maiwand | G07C 9/00571 |

OTHER PUBLICATIONS

Nilsson, D.K., & Larson, U. (2009). A Defense-in-Depth Approach to Securing the Wireless Vehicle Infrastructure. J. Networks, 4, 552-564.
Mohamed Baza, Mahmoud Nabil, Noureddine Lasla, Kemal Fidan, Mohamed M. E. A. Mahmoud, Mohamed M. Abdallah "Blockchain-based Firmware Update Scheme Tailoredfor Autonomous Vehicles." CoRR abs/1811.05905 (2018).
D. K. Nilsson, L. Sun and T. Nakajima, "A Framework for Self-Verification of Firmware Updates over the Air in Vehicle ECUs," 2008 IEEE Globecom Workshops, New Orleans, LA, 2008, Abstract and Introduction.

(Continued)

*Primary Examiner* — Bradley W Holder (57) ABSTRACT

A processing system of a vehicle having at least one processor may obtain, from a network-based security system, at least a first security code, apply a hash operation to a firmware code of the vehicle in accordance with the at least the first security code to generate a first hash value, and transmit the first hash value to the network-based security system. The processing system may then obtain from the network-based security system at least a first verification code, the network-based security system providing the at least the first verification code in response to a confirmation of the first hash value, apply the at least the first verification code to a verification function, and generate a signal to enable the operation of the vehicle, in response to a positive verification via the verification function.

20 Claims, 4 Drawing Sheets

(56) References Cited

OTHER PUBLICATIONS

Yanlin Li, Jonathan M. McCune, and Adrian Perrig. 2011. VIPER: verifying the integrity of PERipherals' firmware. In Proceedings of the 18th ACM conference on Computer and communications security (CCS '11). Association for Computing Machinery, New York, NY, USA, 3-16. DOI:https://doi.org/10.1145/2046707.2046711.

National Institute of Standards and Technology, U.S. Department of Commerce, Trapezoid, "Firmware Integrity Verification, Monitoring and Reporting Tool with Mapping to NIST Guidelines," 2015 Cybersecurity Innovation Forum, Sep. 10, 2015.

Chris Hoffman, "How Intel and PC makers prevent you from modifying your laptop's firmware," PC World, World Beyond Windows, Feb. 13, 2015.

D. K. Nilsson and U. E. Larson, "Secure Firmware Updates over the Air in Intelligent Vehicles," ICC Workshops—2008 IEEE International Conference on Communications Workshops, Beijing, 2008, pp. 380-384, doi: 10.1109/ICCW.2008.78.

Andy Greenberg, "Tesla Responds to Chinese Hack With a Major Security Upgrade," Wired, Sep. 27, 2016.

Axis Communications, "Signed firmware, secure boot, and TPM key storage in Axis products," Nov. 2018.

* cited by examiner

ANTI-TAMPER SYSTEM FOR VEHICLE FIRMWARE

The present disclosure relates generally to autonomous and assisted-operation vehicles, and more particularly to methods, computer-readable media, and apparatuses for enabling an operation of a vehicle in accordance with a hash operation and a verification function, and to methods, computer-readable media, and apparatuses for providing verification codes for enabling an operation of a vehicle in response to confirming a hash output associated with a firmware of the vehicle.

BACKGROUND

Autonomous and assisted-operation vehicles, such as self-driving cars, cars with lane assist technology, intelligent braking, adaptive cruise control, and so on may have functionalities controlled by firmware. Firmware may comprise low-level code that is close to the hardware components, and which may enable certain core features. In the case of an autonomous or assisted-operation vehicle, firmware may be embedded in one or more controllers relating to various sensors, actuators, motors, etc. for sensing vehicle surroundings or for causing various actions of the vehicle, such as turning, braking, accelerating, and so on. However, malicious actors may attempt to corrupt such firmware, either during a manufacturing process or by obtaining physical access to the vehicle or components in the middle of a supply chain. The malicious actors may include internal threats, such as rogue design engineers or quality control personnel, and may include external threats such as shipping personnel, personnel at a car dealership, and so on. Some component manufacturers enable over-the-air firmware upgrades, which can provide another avenue for attack remotely over one or more network connections. The firmware may be altered to perform in an unintended and dangerous manner such as: disabling security features (e.g., stopping a vehicle under certain pre-collision scenarios), causing maneuvers which exceed the intended safe operation of the vehicle design (e.g., allow the vehicle to make narrow turns which may expose it to flipping over), and so forth.

SUMMARY

In one example, the present disclosure describes a method, computer-readable medium, and apparatus for enabling an operation of a vehicle in accordance with a hash operation and a verification function. For example, a processing system of a vehicle having at least one processor may obtain, from a network-based security system, at least a first security code, apply a hash operation to a firmware code of the vehicle in accordance with the at least the first security code to generate a first hash value, and transmit the first hash value to the network-based security system. The processing system may then obtain from the network-based security system at least a first verification code, the network-based security system providing the at least the first verification code in response to a confirmation of the first hash value, apply the at least the first verification code to a verification function, and generate a signal to enable the operation of the vehicle, in response to a positive verification via the verification function.

In another example, the present disclosure describes a method, computer-readable medium, and apparatus for providing verification codes for enabling an operation of a vehicle in response to confirming a hash output associated with a firmware of the vehicle. For example, a processing system having at least one processor may receive a request for at least a first security code in response to a signal to commence an operation of a vehicle, transmit the at least the first security code to the vehicle, and obtain from the vehicle a first hash value generated in accordance with a firmware code of the vehicle and the at least the first security code. The processing system may then determine that the first hash value matches a second hash value that is generated in accordance with a trusted copy of the firmware code and the at least the first security code, and transmit to the vehicle at least a first verification code, in response to determining that the first hash value matches the second hash value, where the at least the first verification code is to enable the operation of the vehicle.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Autonomous and assisted-operation vehicles, such as self-driving cars, cars with lane assist technology, intelligent braking, adaptive cruise control, and so on may have functionalities controlled by firmware. Firmware may comprise low-level code that is close to the hardware components, and which may enable certain core features. In the case of an autonomous or assisted-operation vehicle, firmware may be embedded in one or more controllers relating to various sensors, actuators, motors, etc. for sensing vehicle surroundings or for causing various actions of the vehicle, such as turning, braking, accelerating, and so on. Malicious actors may attempt to corrupt such firmware, either during a manufacturing process or by obtaining physical access to the vehicle or components in the middle of a supply chain. The malicious actors may include internal threats, such as rogue design engineers or quality control personnel, and may include external threats such as shipping personnel, personnel at a car dealership, and so on. Some component manufacturers enable over-the-air firmware upgrades, which can provide another avenue for attack remotely over one or more network connections. The firmware may be altered to perform in an unintended and dangerous manner such as: disabling security features (e.g., stopping a vehicle under certain pre-collision scenarios), causing maneuvers which exceed the intended safe operation of the vehicle design (e.g., allow the vehicle to make narrow turns which may expose it to flipping over), and so forth.

Examples of the present disclosure protect the integrity of vehicular systems and devices from attackers attempting to manipulate vehicle firmware. In one example, the present disclosure evaluates the safety features of a vehicle before a movement of the vehicle is commenced. In one example, the present disclosure also evaluates the vehicle's safety features while in motion (e.g., during a trip). Notably, a feature common to autonomous and assisted-operation vehicles is one or more computing systems, e.g., microcontrollers, embedded systems, integrated vehicular systems, navigation systems, sensing systems, drivetrain systems, braking systems, etc. Each vehicular computing system may include components that are deemed essential to the vehicular safety as determined by the vehicle's design engineers. These components provide the functionalities of the vehicle that if altered, may cause harm by allowing the computing system to perform unintended (and likely dangerous) actions, by preventing safety mechanisms from being activated in response to detecting conditions for which such safety mechanisms are intended to kick in, and so forth. In addition, such components may include firmware code that is intended to be immutable (or practically immutable, e.g., where only changes may be provided by a component manufacturer). For instance, firmware code does not include changeable items such as transactions, monitored events, timing logs, etc.

In one example, a verification of the integrity of a vehicle's firmware code may include a verification sequence that may begin with a vehicle detecting a request to verify to be able to operate (the requested operation may be to allow the vehicle to turn on and/or to move in general, or may be for a specific operation, such as navigating to a particular destination, allowing higher speeds above a threshold, allowing operation on a particular roadway or a class of roadway (e.g., highways versus local road), and so forth. It should be noted that the present disclosure may relate to on-road and off-road motor vehicles, watercraft, aircraft, and other types of vehicles. Thus, operations that may be enabled via the present verification sequence may include: allowing a watercraft motor to turn on, allowing a submersible to dive below the surface of the water and/or to exceed a threshold depth, allowing an aircraft to take off and/or to fly above a threshold altitude, and so forth.

The present verification sequence includes a hash operation to generate a hash output (e.g., a hash string) and may proceed as follows. (1) A vehicle may detect a signal to commence an operation of the vehicle, such as the insertion of an ignition key, an unlock signal from a remote control, an entry of a trip plan into a navigation system, a confirmation of a reservation for transportation, pressing an engine or motor start button, and so forth. (2) The vehicle may submit a request to a network-based security system to verify to be able to commence an operation of the vehicle (e.g., to turn on, to start a motor or engine, to undertake a specific action, etc.). The network-based security system may be comprised of one or more computing devices and may be provided by a vehicle manufacturer, a public safety entity, an insurance company, or by a home or enterprise (e.g., a family may have one or more computing devices at home or hosted in a network-based and/or a cloud computing environment to manage the family's vehicle(s), or an enterprise may have a security server (physical server(s), or virtual machines hosted in a single computing device or distributed network-based computing devices, etc.) for managing enterprise vehicle(s)).

(3) The network-based security system may transmit at least one security code to the vehicle (e.g., one or more new randomly generated codes) in response to the request. (4) The vehicle may perform hashing of one or more "critical components" in accordance with the at least one security code. For instance, the hashing may comprise applying a hash function (e.g., a cryptographic hash function). In one example, the vehicle may hash a concatenation of the firmware code of the vehicle component(s) with the at least one security code. Alternatively, or in addition, the at least one security code may comprise at least one parameter of the hash function. In one example, one or more security codes may be used for concatenation with the firmware code, while one or more other security codes may comprise parameters of the hash function.

(5) Upon completion, the vehicle may send the hash value to the network-based security system. (6) The network-based security system may verify the hash value. Specifically, the network-based security system may compare the hash value from the vehicle to a hash value generated from a trusted copy of the firmware code in accordance with the at least one security code. For example, the network-based security system may apply the hash function with the same parameters (and in one example, the same concatenation with the firmware code) to generate a hash value. When the hash values match, the firmware code of the vehicle is verified to be intact (not altered). (7) When verification passes at the network-based security system, the network-based security system may send at least a first verification code (e.g., a solution to a verification function, a complex mathematical equation that is known to the vehicle) to enable the operation of the vehicle. In one example, the at least the first verification code may include at least two values (e.g., a first verification code and a second verification code). In one example, the verification function may comprise an equation of the following form:

$$M*X\char`\^A+N*X\char`\^B+O*X\char`\^C+P*X\char`\^D=Q*Y\char`\^E+R*Y\char`\^F \qquad \text{Equation 1:}$$

For example, parameters A-F and M-R may be known in advance to the vehicle (e.g., A=34, B=22, C=11, D=5, E=40, F=72, M=3, N=2, O=5, P=1, Q=1, R=3). The first verification code may comprise a valid X and the second verification code may comprise a valid Y. When the vehicle solves the equation and it is true (both sides of the equation are equal), then the operation of the vehicle may be enabled. It should be noted that Equation 1 is provided for illustrative purposes and that other, further, and different functions of the same or a similar nature may be utilized in accordance with the present disclosure.

It should be noted that the above process involving interactions between the vehicle and the network-based security system is provided for illustrative purposes. Thus, it should be understood that different variations or modifications of the above-described process may be provided in accordance with various examples of the present disclosure. For example, the network-based security system may not send the second verification code to the vehicle, but may instead send the second verification code to a device of a user of the vehicle. For instance, the user may be a passenger, an operator, a dispatcher, an owner or lessee, a parent allowing an autonomous vehicle to transport a child, etc. The user may then input the second verification code the vehicle. When combined with the first verification code and input to the verification function, the pairing of the correct verification codes may thus enable the operation of the vehicle. This provides an additional layer of security insofar as the vehicle may be restricted to operation only for an intended operator or passenger.

To illustrate, a paying passenger of an autonomous taxi may obtain the second verification code. The autonomous taxi may then be prevented from opening a door or navigating to a destination for anyone other than the paying passenger who may input the second verification code to the vehicle (where the first verification code may be transmitted to the vehicle as described above). Similarly, a parent may initiate a process to enable operation of the vehicle via his or her own computing device and/or directly with the vehicle. However, at the end of the verification process, the second code may be sent to a device of a child. Thus, for example, a family's self-driving car may be dispatched to pick up the child from school, from a friend's house, etc., and only the child who is able to enter the second verification code may be permitted to enable further operation of the vehicle. In addition, the enablement of the operation of the vehicle may be restricted by the parent such that the second verification code may limit the operation of the vehicle to navigating home with the child. In other words, the enabling of the operation of the vehicle via the entry of the second verification code by the child may not permit the child to cause the vehicle to navigate anywhere else.

In one example, the above process, or a variation thereof, may be implemented among the vehicle and the network-based security system during the operation of the vehicle (e.g., while in transit). For example, a party responsible for the vehicle (e.g., an owner, an administrator, etc.) may specify users who may interact with the vehicle (someone to be picked up, personnel of a store who may be permitted to load merchandise into the vehicle, etc.) and/or may specify authorized mobile computing devices associated with these individuals or entities that may be permitted to interact with the vehicle. When one of these permitted devices is detected (e.g., within a wireless coverage, or vicinity of the vehicle), the network-based security system may transmit the verification codes (e.g., a valid X to the vehicle and a valid Y to the mobile computing device). The passenger, permitted operator, loading personnel, etc. may cause the security code Y to be passed from the mobile device to the vehicle, or may manually enter the security code Y via a user interface of the vehicle. This process may be used to initially enable an operation of the vehicle. In addition, in one example, for a vehicle in transit, to enable normal and continuous operation of the vehicle, new verification codes may be sent to the vehicle and to a device of an authorized user (e.g., an operator or passenger) on an ongoing basis (e.g., periodically and/or according to another schedule). In such case, the user may select to enable the mobile device to automatically pass the security code (e.g., security code Y) unless the user provides an additional input to stop the passing of the security code. For instance, if the user senses something is not right, either at the beginning of the trip or during a trip (e.g., a location is off an expected route, a vehicle is travelling too fast, too high, too low, etc.), then the user may select to not allow the security code to passed to the vehicle.

In this case, the vehicle may perform a verification in accordance with the verification function, but the result may be a failure/no-pass. For instance, upon receipt of a first security code (e.g., security code X), the vehicle may be configured to allow a valid second security code (e.g., security code Y) to cause the verification function to check-out within a designated time window (e.g., the second security code must be entered within 5 seconds from receipt of the first security code by the vehicle, within 10 seconds, within 20 seconds, etc.). In the event that the verification function fails to check-out at any time during the operation of the vehicle, an emergency module in the vehicle may bring the vehicle to a full stop in the nearest saf location (e.g., navigating off a highway, navigating to a police station, a shopping plaza, or other public space, navigating to an available and valid parking space, etc.). The vehicle may also send an alert to the responsible party (e.g., the owner or administrator) and may also alert the network-based security system.

In one example, this process may be temporarily disabled if it is sensed that the mobile device of the user is not reachable. For instance, the mobile device of the user may be configured to send a confirmation of receipt of the security code (e.g., in response to receiving each security code). If a confirmation is not received, the network-based security system may assume that the mobile device is not reachable. In one example, the security codes sent to the vehicle and to the mobile device may be designated for use at a future time period, e.g., 30 seconds after being sent form the network-based security system, while the security codes may be sent at a rate of once every 10 seconds, for example. In such case, if a new security code is not received by either the vehicle, the mobile device of the user, or both, it may be detected that either or both of the mobile device of the user or the vehicle is not in communication with the network-based security service. Accordingly, the vehicle may temporarily allow the vehicle to continue operation without additional ongoing verification via the verification function. In one example, the relaxing of this feature may be allowed for a maximum duration of time and/or a maximum number of uses (such as a maximum of 2 minutes, a maximum of 2 complete trips from a start to a destination, etc.).

In one example, the network-based security system may further verify a location of the vehicle. For instance, one type of attack on autonomous or assisted-operation vehicles may attempt to interfere with the location sensing features of the vehicle (e.g., causing a Global Positioning System (GPS) unit to malfunction), or may attempt to interfere with the location reporting of the vehicle (e.g., to cause the vehicle to incorrectly report the vehicle's location to other entities). The malfunctioning of the location sensing features may be via unauthorized changes to the firmware, but may also be caused by deliberate external jamming signals, wireless interference (e.g., from other communication devices, solar activity, etc.), and so forth. The result may be a vehicle leaving a roadway when a position is incorrectly determined, causing a crash between the vehicle and a stationary object, or another vehicle or moving object, and so forth. Accordingly, in one example, a vehicle may report the vehicle's location to the network-based security system, along with the request to verify to be able to commence an operation of the vehicle (e.g., in response to the detection of the signal to commence the operation of the vehicle).

In one example, a number of other nodes (such as other participating vehicles, mobile computing devices, infrastructure nodes (such as 5G microcells, roadside sensors, etc.) may vouch for the reported location. For instance, in one example, before the vehicle transmits the vehicle's location information, the vehicle may query other nodes in the vicinity. In response, each node may send respective location information with a respective signature code to the network-based security system. In one example, signature codes are changeable based on a derived key from a master key that may be assigned during initial participation provisioning. The location reported by the vehicle and the other locations obtained from the nearby nodes may be compared to determine proximity. When the reported location of the vehicle does not match with the locations of the nearby reporting nodes, the network-based security system may detect that the firmware code of the vehicle (in particular, the location sensing features) may be corrupted. In such case, the network-based security system may block sending of the security code(s) and/or verification code(s). In one example, If the location cannot be verified (e.g., due to an insufficient number of nearby nodes, such as when the vehicle may be in an isolated area) the network-based security system may accept an input by a responsible party (e.g., owner or administrator) via the vehicle confirming that the location of the vehicle that is being reported is in fact correct.

In one example, the above operations of the vehicle may be provided via an anti-tamper chip that may be coupled to one or more of the "critical components" of the vehicle for which the firmware code is to be verified. The vehicle functionality described above may also be embodied as firmware installed on the anti-tamper module (e.g., a chip, an integrated circuit comprising an application specific integrated circuit (ASIC), a field-programmable gate array (FPGA), or the like, and so forth). In addition, the security codes(s), the hash function, and/or the parameter(s) of the hash function, the verification code(s), the verification function, and/or the parameters of the verification function may similarly be stored on the anti-tamper module. In one example, the anti-tamper module may be configured to destroy itself upon attempts of physical manipulation to connect to it externally or to dissect it (e.g., zero-writing, physical destruction by triggering a fuse, etc.). In one example, communications between the vehicle and the network-based security system may be authenticated via 3rd party certificates and encrypted. The communication may be via cellular or non-cellular wireless signals (e.g., IEEE 802.11 (Wi-Fi), 802.16 (WiMAX), or the like), or via a wired connection (e.g., if the vehicle is capable of being plugged-in for a wired networking connection).

In one example, the communication of the codes and checks can be performed via text/Short Message Service (SMS) messages with a user's mobile computing device (e.g., a cellular smartphone, a smartwatch or other wearable computing device, a tablet computer, etc.). For instance, a user may submit a request to operate the vehicle to the network-based security system and receive at least one security code in response. The user may then input the at least one security code to the vehicle (e.g., to a computing system, or processing system of the vehicle). The vehicle may run the hash function and output the hash value (e.g., to a screen that may be read by the user). The user may then copy the hash value and transmit the hash value to the network-based security system. Upon positive confirmation of the firmware code from the network-based security system, at least a first verification code may be transmitted back to the device of the user. The user may then input the verification code(s) to the vehicle for verification via the verification function.

In case a connection to the network-based security system is not available (e.g., an area with no cellular network coverage), the vehicle may store and use the last security code(s) and verification codes(s) (and in one example, the last parameter(s) of the hash function and/or the last parameter(s) of the verification function) to enable the operation of the vehicle (provided the last verification was successful). In one example, the vehicle may use this procedure until there is connectivity to the network-based security system. In another example, the vehicle may use this procedure a predetermined maximum number of times (e.g., two times, three times, etc.) until connectivity to the network-based security system is required to perform a new verification in accordance with new security code(s) and verification codes(s) (and in one example, new parameter(s) of the hash function and/or new parameter(s) of the verification function). In one example, the vehicle may raise an alert indicating that a network connection between the vehicle and the network-based security system should be established. These and other aspects of the present disclosure are described in greater detail below in connection with the examples of FIGS. 1-4.

Figure 1:
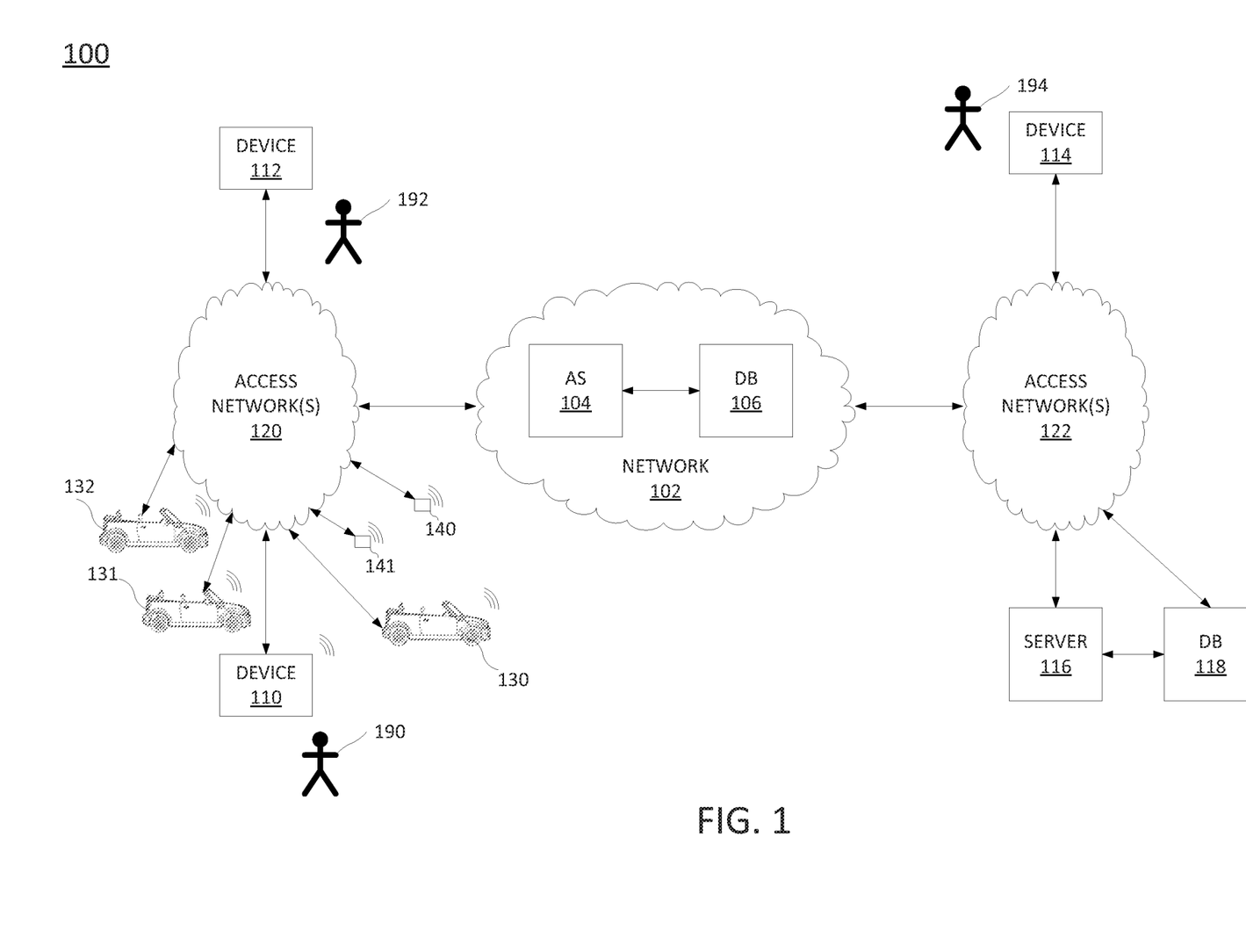
FIG. 1 illustrates an example network related to the present disclosure.

To further aid in understanding the present disclosure, FIG. 1 illustrates an example system 100 in which examples of the present disclosure for enabling an operation of a vehicle in accordance with a hash operation and a verification function and/or for providing verification codes for enabling an operation of a vehicle in response to confirming a hash output associated with a firmware of the vehicle may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102. The network 102 may be in communication with one or more access networks 120 and 122, and the Internet (not shown). In one example, network 102 may combine telecommunication network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114. The devices 110, 112, and 114 may be associated with users 190, 192, and 194, respectively. Access networks 120 and 122 may transmit and receive communications between devices 110, 112, and 114, between devices 110, 112, and 114, and server 116 and/or database (DB) 118, application server (AS) 104 and/or database (DB) 106, other components of network 102, vehicles 130-132, devices reachable via the Internet in general, and so forth. In one example, each of the devices 110, 112, and 114 may comprise any single device or combination of devices that may comprise a user endpoint device. For example, the devices 110, 112, and 114 may each comprise a mobile device, a cellular smart phone, a laptop, a tablet computer, a desktop computer, an application server, a bank or cluster of such devices, and the like. In one example, any one or more of devices 110, 112, and/or 114 may each comprise a computing system or device, such as computing system 400 depicted in FIG. 4, and may be configured to provide one or more operations or functions in support of examples of the present disclosure for enabling an operation of a vehicle in accordance with a hash operation and a verification function and/or for providing verification codes for enabling an operation of a vehicle in response to confirming a hash output associated with a firmware of the vehicle.

Figure 2:
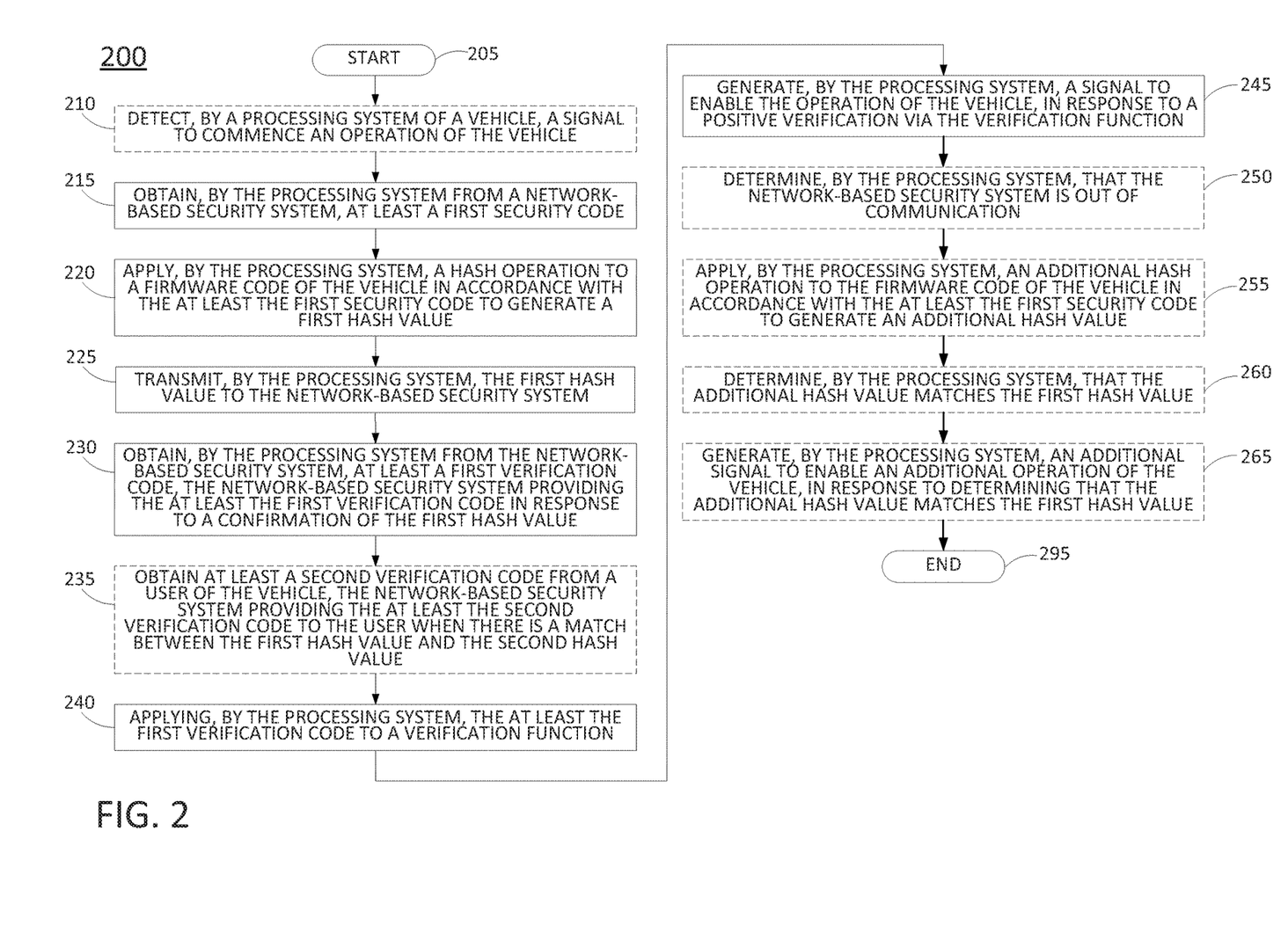
FIG. 2 illustrates a flowchart of an example method for enabling an operation of a vehicle in accordance with a hash operation and a verification function.
Figure 3:
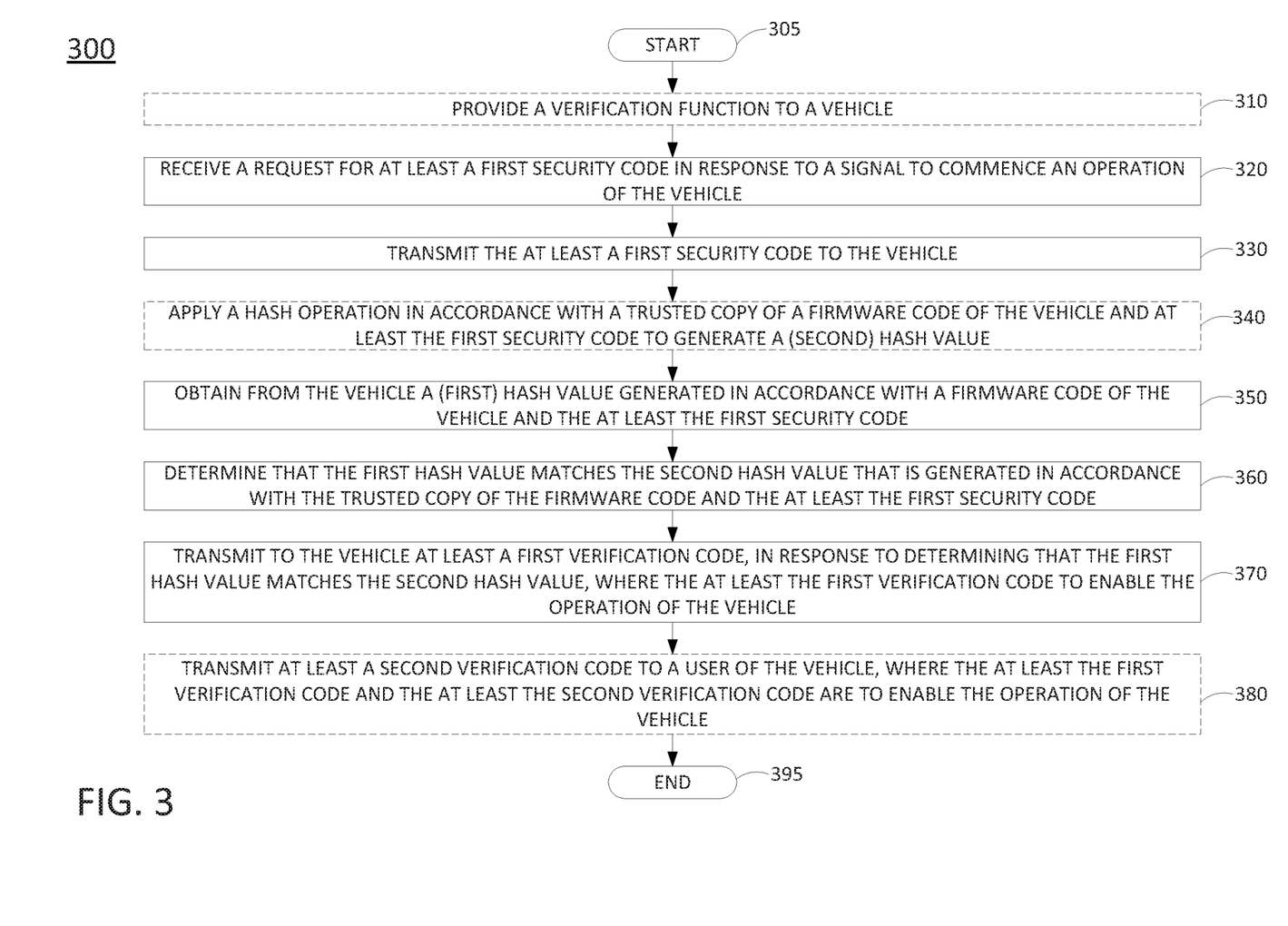
FIG. 3 illustrates a flowchart of an example method for providing verification codes for enabling an operation of a vehicle in response to confirming a hash output associated with a firmware of the vehicle.

As further illustrated in FIG. 1, the access networks 120 may also be in communication with a plurality of vehicles, e.g., vehicles 130-132, and a plurality of infrastructure nodes (e.g., nodes 140 and 141). The vehicles 130-132 may each comprise an autonomous vehicle or assisted-operation vehicle. As illustrated in FIG. 1, the vehicles 130-132 may comprise cars. However, in accordance with the present disclosure, an autonomous vehicle or assisted-operation vehicle may include a car, a truck, a boat, an all-terrain vehicle (ATV), an aircraft, a submersible, an electric scooter, an electric bicycle, a motorcycle, a moped, etc. At a minimum, each of vehicles 130-132 may include a processing system (e.g., a computing system having one or more processors) for enabling at least one operation of the respective vehicle. For instance, each of vehicles 130-132 may comprise a computing system or device, such as computing system 400 depicted in FIG. 4, and may be configured to perform operations for enabling an operation of a vehicle in accordance with a hash operation and a verification function and/or to perform operations in connection with examples of the present disclosure for providing verification codes for enabling an operation of a vehicle in response to confirming a hash output associated with a firmware of the vehicle. For instance, an example method 200 for enabling an operation of a vehicle in accordance with a hash operation and a verification function is illustrated in FIG. 2 and discussed in greater detail below. In addition, an example method 300 for providing verification codes for enabling an operation of a vehicle in response to confirming a hash output associated with a firmware of the vehicle is illustrated in FIG. 3 and discussed in greater detail below.

Figure 4:
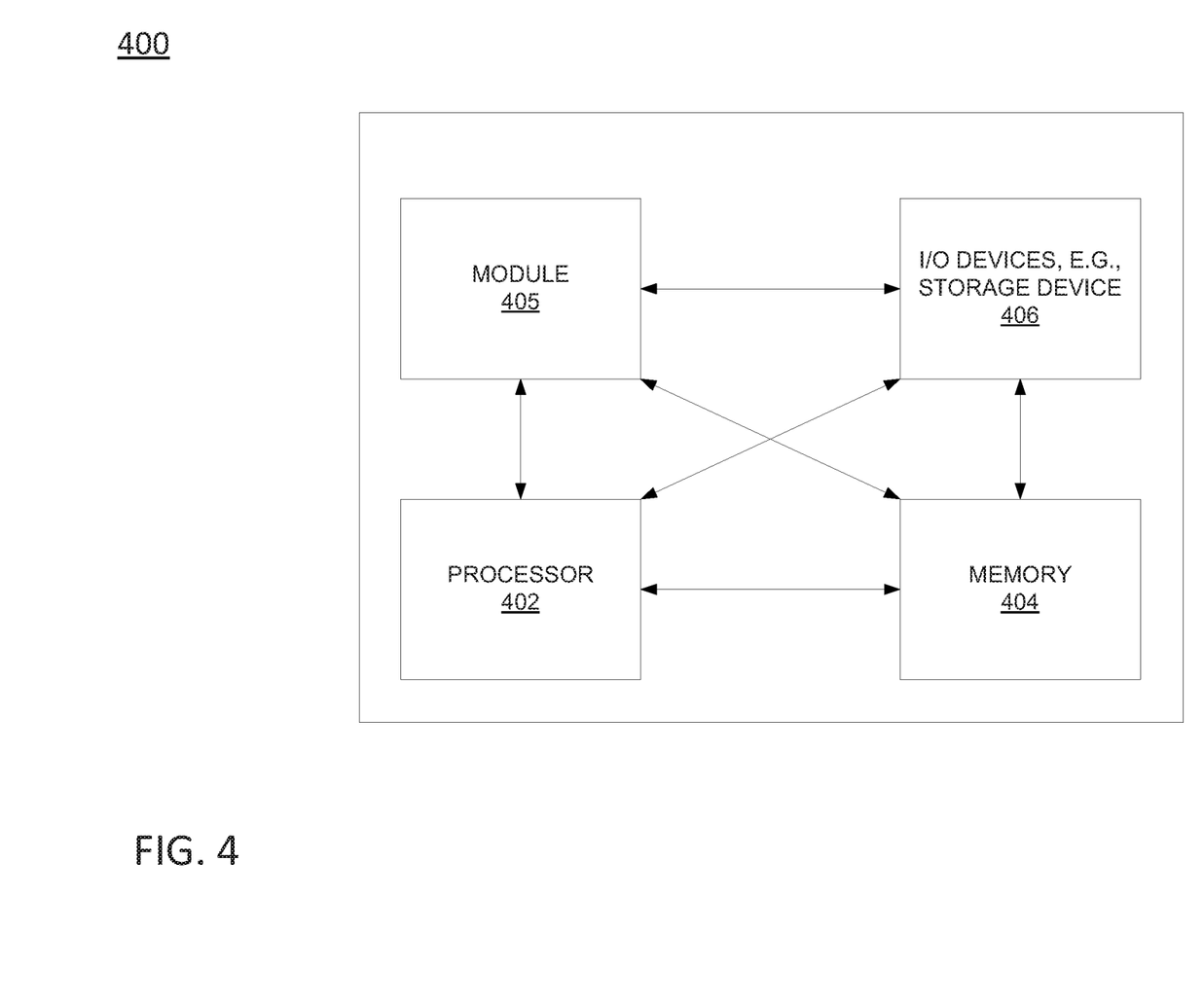
FIG. 4 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

The access networks 122 may also be in communication with a server 116 and a database (DB) 118. In accordance with the present disclosure, server 116 may comprise a computing system or server, such as computing system 400 depicted in FIG. 4, and may be configured to provide one or more operations or functions for providing verification codes for enabling an operation of a vehicle in response to confirming a hash output associated with a firmware of the vehicle, as described herein. Server 116 may also be configured to provide one or more operations or functions in support of examples of the present disclosure for enabling an operation of a vehicle in accordance with a hash operation and a verification function, as described herein. In one example, the server 116, or collectively the server 116 and DB 118, may comprise a network-based security system as described herein. For example, DB 118 may comprise a physical storage device integrated with server 116 (e.g., a database server), or attached or coupled to the server 116, to store various types of information in support of systems for enabling an operation of a vehicle in accordance with a hash operation and a verification function and/or for providing verification codes for enabling an operation of a vehicle in response to confirming a hash output associated with a firmware of the vehicle.

To illustrate, DB 118 may store trusted copies of firmware code of various vehicles or types of vehicles, specific modules (e.g., "critical components") of such vehicles, and so forth. In one example, DB 118 may also store hashes, or hash values, generated from trusted copies (e.g., in accordance with one or more security codes as described herein). In addition, DB 118 may store information regarding the responsible entities/users associated with various vehicles (e.g., owners, administrators, etc.), the permitted operators and/or passengers of such vehicles, and so forth. For instance, DB 118 may store user identifications, identifications and/or contact information regarding these users' computing devices (e.g., cellular phone numbers, International Mobile Subscriber Identity (IMSI) numbers, International Mobile Equipment Identifier (IMEI) numbers, screen names, user identifications (IDs), email addresses, etc.). In one example, DB 118 may also store security codes that may be provided or which have been provided to vehicles, verification codes that may be provided or which have been provided to vehicles and/or to users, and so on. In addition, in one example, DB 118 may also store programs, logic, or instructions that may be executed by AS server 116 to perform operations for providing verification codes for enabling an operation of a vehicle in response to confirming a hash output associated with a firmware of the vehicle, and so forth.

In an illustrative example, the system 100 may enable a parent to schedule an autonomous vehicle to pick up a child and return home, while verifying the integrity of the vehicle's firmware prior to commencing the return trip. For instance user 194 may comprise the parent and may remotely schedule a trip for vehicle 130 by entering trip information, providing authorization(s) (e.g., username, password, etc.) via device 114, which may be sent to the vehicle 130 and/or the server 116, and so forth. In one example, the vehicle 130 may deem the submission of a scheduled trip as a signal to commence operation of the vehicle 130, and may then request and obtain at least a first security code from server 116. In another example, the scheduling of the trip may be notified directly to the server 116, upon which the server 116 may generate and send the at least the first security code (e.g., a random code) to the vehicle 130.

The vehicle 130 may then apply a hash operation to a firmware code of the vehicle 130 in accordance with the at least the first security code to generate a first hash value and transmit the first hash value to the server 116. The server 116 may then determine whether the first hash value matches a second hash value that is generated in accordance with a trusted copy of the firmware code (e.g., stored at DB 118) and the at least the first security code. The server 116 may then transmit at least a first verification code to the vehicle 130, when it is determined that the first hash value matches the second hash value. In addition, the server 116 may send at least a second hash value to the child who is to be picked up by the vehicle 130, e.g., user 190 via device 110. On the other hand, if the hash values do not match, the server 116 may determine that the firmware may be altered and may not send the verification codes. For example, a bad actor (e.g., user 192) may access the computing system(s) of vehicle 130 via device 112 and may force an over-the-air (OTA) firmware change. In this case, the lack of verification codes may prevent the vehicle 130 from commencing and/or continuing the planned trip.

For illustrative purposes, it may be assumed that the hash values match and that the verification codes are sent by the server 116 and received by the vehicle 130 and the device 110, respectively. In one example, when the vehicle 130 determines that the vehicle 130 is near or collocated with the user 190 and/or the device 110, the vehicle 130 may request that the user 190 enter the at least the second security code, either by transmission from the device 110 to the vehicle 130 (e.g., via a non-cellular wireless connection, such as an IEEE 802.11 connection, via a near-field communication (NFC), such as an IEEE 802.15 connection, etc.), or by manual entry via a user interface of the vehicle 130 (e.g., a touchscreen, a keypad, etc.). The vehicle 130 may apply the at least the first verification code and the at least the second verification code to a verification function. When the vehicle 130 obtains a positive verification via the verification function, the vehicle 130 may enable the commencement of the trip home for the child (e.g., user 190).

In one example, the server 116 may also provide a location verification to the vehicle 130. For instance, the vehicle 130 may provide location information determined via the vehicle's location sensing features (e.g., a GPS) to server 116. In addition, vehicle 130 may transmit a request to nodes within wireless communication range (e.g., within range to communicate via non-cellular wireless and/or NFC links) to verify the location of vehicle 130. For instance, the vehicle 130 may broadcast the request along with a unique identifier. One or more nodes that detect the request may then submit their own location information to server 116 along with the unique identifier. For instance, infrastructure nodes 140 and 141, vehicle 131, etc. may all detect the request and may transmit their own location information to server 116. Server 116 may then correlate the location information received from the one or more nodes with the location information received from vehicle 130. When the location information is correlated (e.g., when a location reported by the vehicle 130 is within a threshold distance from a centroid of the locations of the respective one or more nodes), the server 116 may permit the transmission of the verification codes.

In one example, the server 116 may continue to send verification codes (e.g., paired verification codes) to the vehicle 130 and to the device 110, respectively. In such an example, the child (user 190), may cause device 110 to pass the verification codes to the vehicle 130 for ongoing verifications via the verification function. If the child (user 190) senses a problem, the child (user 190) may control device 110 to prevent device 110 from passing verification codes to vehicle 130. This may cause one or more negative verifications via the verification function, which may cause vehicle 130 to navigate to a nearest safe place.

Although only a single server 116 and a single DB 118 are illustrated, it should be noted that any number of servers 116 or databases 118 may be deployed. In one example, network 102 may also include an application server (AS) 104 and a database (DB) 106. In one example, AS 104 may perform the same or similar functions as server 116. Similarly, DB 106 may store the same or similar information as DB 118. (e.g., trusted copies of vehicle firmware, user identification information, security codes, verification codes, hash functions, verification functions, and/or parameters thereof, programs, logic, or instructions that may be executed by AS 104 and/or server 116 for providing verification codes for enabling an operation of a vehicle in response to confirming a hash output associated with a firmware of the vehicle, and so forth). For instance, network 102 may provide a service to subscribing devices for verifying vehicle firmware and permitting vehicle operations, e.g., in addition to television, phone, and/or other telecommunication services. In one example, AS 104, DB 106, server 116, and/or DB 118, or any one or more of such devices in conjunction with one or more of devices 110, 112, and/or 114, may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114 and server 116 may access network 102 via different access networks, devices 110 and 112 may access network 102 via different access networks, and so forth. Thus, these and other modifications are all contemplated within the scope of the present disclosure.

FIG. 2 illustrates a flowchart of an example method 200 for enabling an operation of a vehicle in accordance with a hash operation and a verification function, in accordance with the present disclosure. In one example, the method 200 is performed by a component of the system 100 of FIG. 1, such as by one of vehicles 130-132, and/or any one or more components thereof (e.g., a processing system comprising at least a processor, or processors, performing operations stored in and loaded from a memory), by a plurality of the vehicles 130-132, or by any one or more of such devices in conjunction with one or more other devices, such as devices 110, 112, or 114, server 116, DB 118, AS 104, and/or DB 106, and so forth. In one example, the steps, functions, or operations of method 200 may be performed by a computing device or system 400, and/or processor 402 as described in connection with FIG. 4 below. For instance, the computing device or system 400 may represent any one or more components of a device, vehicle, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system. The method 200 begins in step 205 and may proceed to optional step 210 or to step 215.

At optional step 210, a processing system of a vehicle may detect a signal to commence an operation of the vehicle. The signal may comprise, for example, an insertion of an ignition key, an unlock signal from a remote control, an entry of a trip plan into a navigation system, a confirmation of a reservation for transportation, pressing an engine or motor start button, and so forth. The vehicle may comprise an autonomous or assisted-operation vehicle that is capable of carrying at least one operator and/or passenger, such as a car, a truck, a boat, an all-terrain vehicle (ATV), an aircraft, a submersible, an electric scooter, an electric bicycle, a motorcycle, a moped, etc.

At step 215, the processing system of the vehicle obtains from a network-based security system, at least a first security code. In one example, step 215 may comprise requesting and receiving the at least the first security code from the network-based security system in response to detecting the signal to commence the operation of the vehicle at optional step 210. In one example, the network-based security system may transmit the at least the first security code without solicitation from the processing system of the vehicle. For instance, an owner or administrator of the vehicle may submit a planned trip for the vehicle via the network-based security system. Thus, in one example, the first notification of the planned trip that the vehicle receives may be from the network-based security system sending the at least the first security code.

At step 220, the processing system of the vehicle applies a hash operation to a firmware code of the vehicle in accordance with the at least the first security code to generate a first hash value. In one example, the hash operation may comprise a cryptographic hash operation (e.g., applying a cryptographic hash algorithm). In one example, the hash operation is applied to a concatenation of the firmware code of the vehicle and the at least the first security code to generate the first hash value. For instance, the at least the first security code may be appended before or after the firmware code (or appended both before and after) prior to applying the hash operation. Alternatively, or in addition, the at least the first security code may comprise at least one parameter of the hash operation. For instance, the hash operation may comprise a defined algorithm, but which may have variables/parameters which may be tuned. In one example, the at least the first security code may include at least one code that is used for concatenation with the firmware code, and one or more additional security codes which comprise parameters of the hash function.

At step 225, the processing system transmits the first hash value to the network-based security system.

At step 230, the processing system of the vehicle obtains, from the network-based security system, at least a first verification code. For instance, the network-based security system may provide at least the first verification code in response to a confirmation of the first hash value. For example, the confirmation of the first hash value may comprise a match between the first hash value and a second hash value generated by the network-based security system in accordance with a trusted copy of the firmware code and the first security code. In particular, the network-based security system may generate and/or may store the second hash value based upon an application of the same hash operation with the same parameters to the trusted copy of the firmware code (and/or the trusted copy of the firmware code with the at least the first security code appended).

In one example, the at least the first verification code that is obtained by the processing system of the vehicle from the network-based security system may comprise a first verification code and a second verification code, where the first verification code and a second verification code are paired. In another example, the network-based security system may send the at least the first verification code the vehicle, and may send at least a second verification code to a user of the vehicle, e.g., an operator of the vehicle, a passenger (e.g., an intended or current passenger) of the vehicle, an owner of the vehicle, an administrator of the vehicle, etc. In one example, an identification of the user may be provided to the network-based security system by the vehicle, by a device of the user, or by a device of an entity responsible for the vehicle (e.g., an owner, a lessee, a management company of a fleet of vehicles (e.g., taxis), a dispatcher, a parent for child, etc.).

In this regard, at optional step 235, the processing system may obtain at least a second verification code from a user of the vehicle. For instance, the network-based security system may provide the at least the second verification code to the user when there is a match between the first hash value and the second hash value. The user may then transmit the at least the second verification code to the processing system of the vehicle, or may enter the at least the second verification code via a user interface of the processing system and/or the vehicle, such as a touchscreen, a keypad, etc. Thus, the at least the second verification code may be obtained from a manual input by the user or from a computing device of the user.

At step 240, the processing system of the vehicle applies the at least the first verification code to a verification function. In one example, step 240 includes applying the at least the first verification code and the at least the second verification code to the verification function. In one example, the verification function comprises a polynomial equation with a plurality of polynomial terms having a plurality of factors. For instance, the factors may be fixed or tunable parameters of the verification function. In one example, the at least the first verification code comprises at least a first variable of the verification function, and the at least the second verification code comprises at least a second variable of the verification function. For instance, the first verification code and second verification code may comprise variables X and Y of Equation 1 above. In one example, a positive verification may comprises a determination of an equality of the verification function in accordance with the at least the first verification code and the at least the second verification code.

At step 245, the processing system may generate a signal to enable the operation of the vehicle, in response to a positive verification via the verification function. For instance, the signal may be an electrical control signal, a wireless control signal, an optical control signal, etc. to start a motor or engine of the vehicle, to release a door lock, to enable a user to control a wheel of the vehicle, to enable a throttle, etc. For instance, certain essential modules of the vehicle may include hardware switches or the like which prevent operation of the respective module, or the vehicle as a whole, unless activated via a dedicated signaling path from the processing system, which may include or may be embodied as an anti-tamper module (e.g., a chip, an integrated circuit comprising an ASIC, a FPGA, or the like, and so forth).

At optional step 250, the processing system of the vehicle may determine that the network-based security system is out of communication. For instance, the vehicle may fail to receive a periodic transmission of one or more new verification codes, may fail to receive a response to a heartbeat message, a ping request, a keep-alive request, etc. to the network-based security system, etc. For example, the vehicle may be navigated to an area without network coverage or with poor network coverage, or one or more intermediary networks between the vehicle and the network-based security server may experience problems that prevent routing communications between the two entities.

At optional step 255, the processing system may apply an additional hash operation to the firmware code of the vehicle in accordance with the at least the first security code to generate an additional hash value. For instance, optional step 255 (and subsequently optional steps 260 and 265) may be performed in response to detecting that the vehicle is out of communication with the network-based security server.

At optional step 260, the processing system determines that the additional hash value matches the first hash value. For instance, the processing system may store the first hash value (e.g., following step 230, whereupon the vehicle has received verification from the network-based server that the first hash value checks-out). Thus, the processing system may compare the additional hash value generated at optional step 255 to a previously valid (first) hash value that is stored by the processing system. When these hash values are equal, the processing system may therefore determine that the hash value output via the hash function is not changed (and hence the firmware appears to not have been changed during the period of time between step 230 and optional step 260).

At optional step 265, the processing system generates an additional signal to enable an additional operation of the vehicle, in response to determining that the additional hash value matches the first hash value at optional step 260. The additional operation may be to allow the vehicle to continue on a current course, to continue along a planned route that the vehicle is in the middle of navigating, to continue to allow a user to control the vehicle, etc., or may be to allow the vehicle to start a new trip, to turn on a motor or an engine that was previously turned off, and so forth. In one example, the pathway of optional steps 250-265 may be used for a limited number of times (e.g., two times, three times, etc.) before the vehicle will not operate without a connection to the network-based security system.

Following step 245 or any of optional steps 250-265 the method 200 proceeds to step 295 where the method 200 ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200 by detecting additional signals to commence operation of the vehicle, obtaining new security codes, performing hash operations, submitting hash values to the network-based security server, obtaining verification codes, generating signals to enable operations of the vehicle in response to positive verifications via the verification function, and so on. In one example, the method 200 may additionally include obtaining an identification of the user and providing the identification to the network-based security server, which may verify that the user is authorized. For example, the user may be a passenger requesting transportation from a self-driving taxi. In addition to verifying the integrity of the taxi's firmware, the network-based security server may also verify that the passenger has paid or has funds to pay for the trip, is not barred from the service due to previous misuse, etc. The identification of the user also allows the network-based server to correctly send the at least the second verification code at optional step 235. In one example, the method 200 may also include operations to verify a location of the vehicle, such as transmitting location information of the vehicle to the network-based security system, broadcasting a unique identifier and a request to nodes in the vicinity of the vehicle to report respective locations, and so forth.

In one example, the method 200 may also include obtaining the hash operation from the network-based security server, obtaining parameters of the hash operation from the network-based security server, or both. For instance, the hash operation (e.g., the hash function/algorithm) and/or the parameters thereof may be updated periodically or according to another schedule. In such case, the at least the first security code may not represent any parameters of the hash function but may be used only for appending to the firmware code. In one example, the at least the first verification code, the at least the second verification code, or both, may alternatively or additionally comprise or include parameters of the verification function (such as the tunable parameters A-F and/or M-R in Equation 1 above). In addition, in one example, the method 200 may also include obtaining the verification function from the network-based security server, obtaining parameters of the verification function from the network-based security server, or both. For instance, the verification function and/or the parameters thereof may be updated periodically or according to another schedule. Thus, these and other modifications are all contemplated within the scope of the present disclosure.

FIG. 3 illustrates a flowchart of an example method 300 for providing verification codes for enabling an operation of a vehicle in response to confirming a hash output associated with a firmware of the vehicle, in accordance with the present disclosure. In one example, the method 300 is performed by a component of the system 100 of FIG. 1, such as server 116, application server 104, and/or any one or more components thereof (e.g., a processing system comprising at least a processor, or processors, performing operations stored in and loaded from a memory), or by any one or more of such devices in conjunction with one or more other devices, such as DB 118, DB 106, vehicles 130-132, devices 110, 112, or 114, and so forth. In one example, the steps, functions, or operations of method 300 may be performed by a computing device or system 400, and/or processor 402 as described in connection with FIG. 4 below. For instance, the computing device or system 400 may represent any one or more components of a server and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 300 may collectively function as a processing system. For illustrative purposes, the method 300 is described in greater detail below in connection with an example performed by a processing system. The method 300 begins in step 305 and may proceed to optional step 310 or to step 320.

At step 310, the processing system (e.g., a network-based security system) may provide a verification function to a vehicle. For example, the operation of the vehicle may be enabled via the verification function.

At optional step 320, the processing system receives a request for a security code in response to a signal to commence an operation of the vehicle. For instance, the request may be received from the vehicle, or may be received from a device of a user (e.g., an owner, an administrator, a passenger, an operator, etc.).

At step 330, the processing system transmits at least a first security code to the vehicle. For instance, the at least the first security code may comprise a randomly generated code, or codes.

At optional step 340, the processing system applies a hash operation in accordance with a trusted copy of a firmware code of the vehicle and at least the first security code to generate a hash value, e.g., a "second" hash value. In one example, the hash operation (e.g., a cryptographic hash function) may be applied to a concatenation of the trusted copy of the firmware code and the at least the first security code. Alternatively or in addition, the at least the first security code may include one or more tunable parameters of the hash operation that is applied.

At step 350, the processing system obtains from the vehicle a hash value, e.g., a "first" hash value generated by the vehicle in accordance with a firmware code of the vehicle and the at least the first security code. For instance, the vehicle may apply the hash operation to a concatenation of the firmware code and at least the first security code.

Alternatively, or in addition, the first security code may comprise at least one parameter of the hash function that is applied to the firmware code.

At optional step 360, the processing system determines that the first hash value matches the second hash value that is generated in accordance with the trusted copy of the firmware code and the at least the first security code.

At step 370, the processing system transmits to the vehicle at least a first verification code, in response to determining at step 360 that the first hash value matches the second hash value. For instance, the at least the first verification code may be for enabling the operation of the vehicle, e.g., in accordance with a verification function implemented by the vehicle. In one example, the at least the first verification code may comprise the at least the first verification code and at least a second verification code, wherein the at least the first verification code and the at least the second verification code are collectively to enable the operation of the vehicle. For example, the at least the first verification code and the at least the second verification code may comprise variables of the verification function.

At optional step 380, the processing system may transmit at least a second verification code to a user of the vehicle. For instance, a pairing of the at least the first verification code and the at least the second verification code is to enable the operation of the vehicle. For example, as described above, a parent may arrange for the vehicle to be operational only for a child intended to be picked up by the vehicle. In another example, the vehicle may comprise a self-driving taxi, a rental car, etc., and the processing system may enable the vehicle to be operational only for the intended paying customer, and so forth.

Following step 370 or optional step 380, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 by receiving additional requests for security codes for commencing operation of the same vehicle or one or more different vehicles, transmitting security codes, obtaining hash values, comparing hash values to stored and/or generated hash values of trusted stored copies of vehicle firmware, transmitting verification codes, and so on. In one example, the method 300 may also include operations to verify a location of the vehicle, such as obtaining location information of the vehicle and nodes in the vicinity of the vehicle, determining that the locations are correlated (e.g., within a threshold distance), and so on.

In one example, the method 300 may also include transmitting the hash operation and/or parameters of the hash operation to the vehicle. For instance, the processing system may update the hash operation (e.g., the hash function/algorithm) and/or the parameters thereof periodically or according to another schedule. In one example, the at least the first verification code, the at least the second verification code, or both, may alternatively or additional comprise or include parameters of the verification function. In one example, optional step 310 may include providing parameters of the verification function to the vehicle. For instance, the verification function and/or the parameters thereof may be updated by the processing system periodically or according to another schedule. In one example, different hash operations and/or parameters thereof, different verification functions and/or the parameters thereof, and so forth may be utilized by the processing system in connection with different vehicles that utilize the services of the processing system (e.g., a network-based security system). Thus, these and other modifications are all contemplated within the scope of the present disclosure.

In addition, although not expressly specified above, one or more steps of the method 200 or the method 300 may include a storing, displaying and/or outputting step as required for a particular application. In other words, any data, records, fields, and/or intermediate results discussed in the method 200 or the method 300 can be stored, displayed and/or outputted to another device as required for a particular application. Furthermore, operations, steps, or blocks in FIG. 2 of FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 200 or the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for enabling an operation of a vehicle in accordance with a hash operation and a verification function or for providing verification codes for enabling an operation of a vehicle in response to confirming a hash output associated with a firmware of the vehicle, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for enabling an operation of a vehicle in accordance with a hash operation and a verification function or for providing verification codes for enabling an operation of a vehicle in response to confirming a hash output associated with a firmware of the vehicle (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for enabling an operation of a vehicle in accordance with a hash operation and a verification function or for providing verification codes for enabling an operation of a vehicle in response to confirming a hash output associated with a firmware of the vehicle (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
obtaining, by a processing system of a vehicle including at least one processor from a network-based security system, at least a first security code;
applying, by the processing system, a hash operation to a firmware code of the vehicle in accordance with the at least the first security code to generate a first hash value;

transmitting, by the processing system, the first hash value to the network-based security system;

obtaining, by the processing system from the network-based security system, at least a first verification code, wherein the network-based security system provides the at least the first verification code in response to a confirmation of the first hash value, wherein the confirmation of the first hash value comprises a match between the first hash value and a second hash value generated by the network-based security system in accordance with a trusted copy of the firmware code and the at least the first security code;

applying, by the processing system, the at least the first verification code to a verification function; and generating, by the processing system, a signal to enable the operation of the vehicle, in response to a positive verification via the verification function.

2. The method of claim 1, further comprising:
detecting, by the processing system, a signal to commence an operation of the vehicle, wherein the obtaining the at least the first security code is in response to the detecting the signal to the commence the operation of the vehicle.

3. The method of claim 1, wherein the hash operation is applied to a concatenation of the firmware code of the vehicle and the at least the first security code to generate the first hash value.

4. The method of claim 1, wherein the at least the first security code comprises at least one parameter of the hash operation.

5. The method of claim 1, wherein the applying the at least the first verification code to the verification function comprises applying the at least the first verification code and at least a second verification code to the verification function.

6. The method of claim 5, wherein the verification function comprises a polynomial equation with a plurality of polynomial terms having a plurality of factors.

7. The method of claim 6, wherein the at least the first verification code comprises at least a first variable of the verification function, and wherein the at least the second verification code comprises at least a second variable of the verification function.

8. The method of claim 5, wherein the obtaining the at least the first verification code comprises obtaining the at least the first verification code and the at least the second verification code from the network-based security system.

9. The method of claim 5, further comprising:
obtaining the at least the second verification code from a user of the vehicle, wherein the network-based security system provides the at least the second verification code to the user when there is a match between the first hash value and the second hash value.

10. The method of claim 9, wherein the at least the second verification code is obtained from:
a manual input by the user; or
a computing device of the user.

11. The method of claim 9, wherein an identification of the user is provided to the network-based security system by the vehicle, by a device of the user, or by a device of an entity responsible for the vehicle.

12. The method of claim 11, further comprising:
determining, by the processing system, that the network-based security system is out of communication;

applying, by the processing system, an additional hash operation to the firmware code of the vehicle in accordance with the at least the first security code to generate an additional hash value;

determining, by the processing system, that the additional hash value matches the first hash value; and generating, by the processing system, an additional signal to enable an additional operation of the vehicle, in response to the determining that the additional hash value matches the first hash value.

13. A non-transitory computer-readable medium storing instructions which, when executed by a processing system of a vehicle including at least one processor, cause the processing system to perform operations, the operations comprising:

obtaining, from a network-based security system, at least a first security code;

applying a hash operation to a firmware code of the vehicle in accordance with the at least the first security code to generate a first hash value;

transmitting the first hash value to the network-based security system;

obtaining from the network-based security system at least a first verification code, wherein the network-based security system provides the at least the first verification code in response to a confirmation of the first hash value, wherein the confirmation of the first hash value comprises a match between the first hash value and a second hash value generated by the network-based security system in accordance with a trusted copy of the firmware code and the at least the first security code;

applying the at least the first verification code to a verification function; and generating a signal to enable the operation of the vehicle, in response to a positive verification via the verification function.

14. The non-transitory computer-readable medium of claim 13, wherein the operations further comprise:
detecting a signal to commence an operation of the vehicle, wherein the obtaining the at least the first security code is in response to the detecting the signal to the commence the operation of the vehicle.

15. The non-transitory computer-readable medium of claim 13, wherein the hash operation is applied to a concatenation of the firmware code of the vehicle and the at least the first security code to generate the first hash value.

16. The non-transitory computer-readable medium of claim 13, wherein the at least the first security code comprises at least one parameter of the hash operation.

17. The non-transitory computer-readable medium of claim 13, wherein the applying the at least the first verification code to the verification function comprises applying the at least the first verification code and at least a second verification code to the verification function.

18. The non-transitory computer-readable medium of claim 17, wherein the verification function comprises a polynomial equation with a plurality of polynomial terms having a plurality of factors.

19. The non-transitory computer-readable medium of claim 18, wherein the at least the first verification code comprises at least a first variable of the verification function, and wherein the at least the second verification code comprises at least a second variable of the verification function.

20. An apparatus comprising:
a processing system including at least one hardware processor; and a non-transitory computer-readable medium storing instructions which, when executed by the processing system when deployed in a vehicle, cause the processing system to perform operations, the operations comprising:
  obtaining, from a network-based security system, at least a first security code;
  applying a hash operation to a firmware code of the vehicle in accordance with the at least the first security code to generate a first hash value;
  transmitting the first hash value to the network-based security system;
  obtaining from the network-based security system at least a first verification code, wherein the network-based security system provides the at least the first verification code in response to a confirmation of the first hash value, wherein the confirmation of the first hash value comprises a match between the first hash value and a second hash value generated by the network-based security system in accordance with a trusted copy of the firmware code and the at least the first security code;
  applying the at least the first verification code to a verification function; and
  generating a signal to enable the operation of the vehicle, in response to a positive verification via the verification function.

* * * * *